March 19, 1957    A. A. KAUFMAN    2,785,911
NON-CORROSIVE FLEXIBLE HOSE COUPLING
Filed Oct. 14, 1954
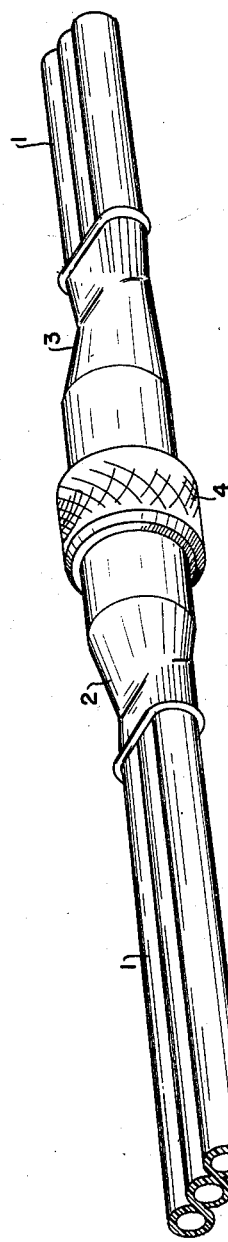
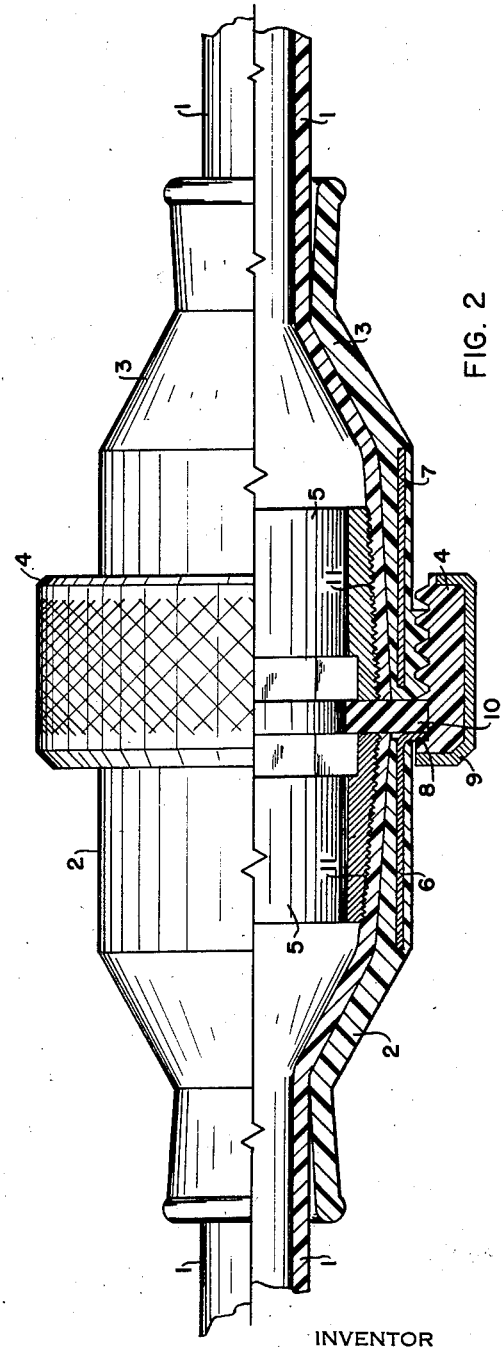
INVENTOR
ALBERT A KAUFMAN
BY Morton, Bennie Edmonds, Barrows & Taylor
ATTORNEYS

United States Patent Office 2,785,911
Patented Mar. 19, 1957

2,785,911

NON-CORROSIVE FLEXIBLE HOSE COUPLING

Albert A. Kaufman, North Plainfield, N. J., assignor, by mesne assignments, to American Hard Rubber Company, a corporation of New York Application October 14, 1954, Serial No. 462,286

6 Claims. (Cl. 285—52)

This invention relates to a hose coupling, especially to a non-corrosive coupling, and in more particularity to a coupling for a multi-tube flexible hose including a further improvement on the coupling disclosed in my co-pending application, Serial No. 316,450, filed October 23, 1952, and entitled Light Weight Multi-Tubular Hose, of which this application is a continuation-in-part.

Heretofore, it has been the practice in joining lengths of hose by hose couplings to surround the ends of the hose with a metal sleeve and to have one of the metal sleeves on the two ends of adjoining hose threaded. The other sleeve usually carried a ring or thimble that was slidably mounted and that was internally threaded so as to engage with the first mentioned threaded sleeve. A washer or gasket was carried in this ring so that when the ring or thimble was screwed on the threaded sleeve, the ends of the hose would be brought into sealing abutment with the gasket. In order to prevent electrolysis (galvanic action) and thus resultant corrosion of the threads, it was necessary that the different metal parts be made of the same material. This meant that if the threaded collar was made of a relatively expensive material such as brass, that the whole coupling assembly had to be made of the same material, even including the parts that were not threaded. The result was a more expensive coupling than one in which there were parts of dissimilar metal. Another form of coupling used in the art to overcome corrosion due to electrolysis or galvanic action was to make all parts of plastic. While corrosion was overcome and the separate parts could be molded rather than machined, the resultant coupling lacked the strength and durability to give reliable service when used on ordinary garden hose. It is therefore an object of this invention to provide for an inexpensive hose coupling that will combine the non-corrosive features of a plastic coupling with the strength and durability of a metal coupling.

In hose of the elastomeric type such as disclosed in my co-pending application, it has been the practice to place a rigid insert in the portion of the hose surrounded by the sleeve in order to make a tight fit between the outside of the hose and the inside of the surrounding sleeve. Such inserts have usually been made of metal such as aluminum so that when they were connected to a bib nozzle made of a different material such as iron or brass, a galvanic action took place. This was because there was a metal to metal contact of the parts in an electrolytic solution, the solution being the water passing through the hose along with its saline impurities.

I propose to overcome the corrosion inherent in ordinary couplings by making a coupling in which the main parts are made of a non-metal as a plastic material and in which any metal parts that are included in the coupling are insulated from one another by intervening non-metallic material. A non-corrosive coupling, according to my invention, has plastic sleeves inserted over the hose ends. One of the sleeves for ends of adjoining hose is threaded and the other sleeve carries a threaded ring or thimble for engaging the threads of the first sleeve. An insert is placed in each hose end that is surrounded by the plastic or non-metallic sleeve in order that the sleeve will make a tight seal with the hose. A gasket is inserted between the ends of the hoses and the threaded ring or thimble and sleeve are screwed together, so that the ends of the hoses and inserts will abut against this gasket. Metal forms can be embedded in the plastic sleeves in order to give them additional strength and the threaded ring or thimble may be placed in a metal shell in order to give it added strength and protection. The result is that none of the metal parts will be in contact with one another so that there will be no possibility of corrosion due to electrolysis or galvanic action even when dissimilar metals are used.

I further propose to make the sleeve in a particular shape so that when it is used on a flexible multi-tube hose as disclosed in my previously mentioned co-pending application, it will give added strength to the hose end and prevent the hose from splitting along the portion where the circular end part joins with the multi-tube part. The shape of the sleeve is so patterned that one end is cylindrical to cooperate with the cylindrical end part of the hose while the other end is flattened into an oblong cross section so as to surround an oblong multi-tube portion of the hose.

Referring to the drawings in which an embodiment of my invention is illustrated, Fig. 1 is a perspective view of a coupling constructed according to my invention as applied to the multi-tube flexible hose disclosed in my co-pending application; and Fig. 2 is a partial longitudinal cross sectional view of the coupling of Fig. 1.

Referring in detail to the drawings, 1 denotes a length of multi-tube flexible hose made of an elastomeric material. 2 is a plastic or other non-metallic sleeve carried on one end of such a hose while 3 is a threaded plastic or other non-metallic sleeve carried on the opposite end of the hose or on the end of an adjoining hose. 4 is a threaded ring or thimble in which the threaded portion is made of "nylon" or other suitable plastic or some other non-metallic material that is capable of being threaded. Annular inserts 5 are fitted in the hose end surrounded by the circular part of the sleeve 2 or 3 respectively in order to force the hose into tight contact with the inner periphery of the sleeve. Metal forms 6 and 7 can be embedded in the sleeves 2 and 3, respectively, in order to give added strength. A portion 8 of the form 6 may protrude slightly from the sleeve to give a bearing surface for the ring or thimble 4 which is rotatably mounted on the sleeve 2. It is to be understood that the forms may be made in any shape so long as they do not come in contact with other metal parts in the coupling assembly. The threaded ring or thimble 4 may likewise be surrounded by a metal shell 9 in order to give it added strength and protection. It is seen from a study of Fig. 2, that all of the metal parts are completely isolated from one another so that they could be made out of different kinds of metal without fear of giving undesirable corrosion.

The inserts 5 can be made of plastic or some easily machined metal, while the shell 9 can be made of any metal. Forms 6 and 7 can be made of still a different metal such as a ferrous metal without danger of corrosion of the threads due to electrolysis or galvanic action. A gasket 10 is carried in the ring or thimble 4 so that when the ring or thimble 4 is screwed on the threaded portion of sleeve 3, it will give a water-tight seal between the ends of the hose and the inserts. This gasket is usually permanently carried in the ring or thimble 4 and is held in place by the land of the innermost thread and the protruding portion 8 of the form 6.

The inserts 5 may be threaded or grooved as at 11 in order that they may be screwed or pressed into the hose, or the hose may be molded about the insert in order to give a tight fit with the inner cylindrical part of the sleeve. While I have shown the end of the insert shaped so as to receive a lug wrench in order that it may be screwed in the hose, it is to be understood that the insert could have other end shapes when it is pressed in the hose or when the hose is molded around it.

Sleeves 2 and 3 when used on a multi-tube hose are flattened at one end into an oblong shape in order to surround and protect the flattened portion of the multi-tube hose. It is not important that the hose be in tight contact with the sleeve except at the circular part of the sleeve adjacent to its end. The flattened portion of the sleeve tends to prevent splitting of the hose where the multi-tube section joins to the circular section.

While only one embodiment of the invention has been disclosed, it is to be understood that there are still other forms of the coupling that could still be within the sphere of the invention. The threaded ring or thimble could be threaded externally to engage with another female threaded ring rotatably carried on the other sleeve so that there would be two threaded rings and none of the sleeves would be threaded. Again, the sleeve now shown as male threaded could be female threaded and the ring be correspondingly male threaded. While I have shown my coupling attached to a multi-tube flexible hose, it is obvious that such a non-corrosive coupling could also be attached to an ordinary single tube hose and still be within the scope of my invention.

I claim:

1. A non-corrosive coupling for a flexible hose, comprising a first sleeve having a cylindrical end portion and having an outwardly extending flange projecting from said cylindrical end portion, a thimble freely rotatably mounted on said sleeve which is prevented from movement axially away from said sleeve toward a hose to be coupled thereto by said outwardly extending flange, said thimble having a threaded non-metallic portion and a metallic reinforcing portion which is prevented from contact with said flange and with said sleeve by said non-metallic portion; a second sleeve which is formed of non-metallic material and which has a cylindrical end portion that is threaded for engagement with the threaded non-metallic portion of said thimble, a metal reinforcing form embedded in the non-metallic material of said second sleeve so as to be out of contact with the threaded portion of said thimble even when the latter is threadedly engaged with said second sleeve, and means for firmly securing the end of a flexible hose to one of said sleeves.

2. A hose coupling in accordance with claim 1, in which said flexible hose is a multi-tubular hose having a plurality of tubes arranged side by side and which is adapted to be secured to one of said sleeves, said one sleeve having a portion shaped to embrace and be secured to an end portion of said multi-tubular hose; and wherein said means for securing the end of a flexible hose comprises an annular insert member for holding said end portion of said multi-tubular hose within the cylindrical portion of said one sleeve.

3. A hose coupling in accordance with claim 1, in which both said sleeves are formed of plastic material and are reinforced by metal forms embedded therein.

4. A hose coupling in accordance with claim 1, comprising in addition, a non-metallic gasket member held within said thimble for preventing axial contact between the end of said hose and its securing means with any metallic parts carried by the sleeve other than that sleeve to which the end of said hose is secured.

5. A hose coupling in accordance with claim 1, in which there is a metallic reinforcing form embedded in the first named sleeve and having an outwardly extending portion forming at least a part of said outwardly extending flange, said first named sleeve being of plastic material except for said metallic form which is embedded therein.

6. A hose coupling in accordance with claim 1, in which said metallic reinforcing portion of said thimble comprises a metallic shell containing a plastic lining portion which constitutes said non-metallic portion of said thimble and which is internally threaded, said shell comprising a substantially cylindrical central part and two substantially annular end parts rigid with said central part.

References Cited in the file of this patent

UNITED STATES PATENTS

| 951,516 | Stephens | Mar. 8, 1910 |
| 2,084,961 | Bondeson | June 22, 1937 |
| 2,545,263 | Corydon | Mar. 13, 1951 |

FOREIGN PATENTS

| 102,807 | Australia | Jan. 13, 1938 |